Nov. 3, 1931.  R. K. LEE  1,830,117

MOTOR MOUNTING

Filed July 21, 1928

INVENTOR
ROGER K. LEE.
BY
ATTORNEY

Patented Nov. 3, 1931

1,830,117

UNITED STATES PATENT OFFICE

ROGER K. LEE, OF DETROIT, MICHIGAN, ASSIGNOR TO CHRYSLER CORPORATION, OF DETROIT, MICHIGAN, A CORPORATION OF DELAWARE

MOTOR MOUNTING

Application filed July 21, 1928. Serial No. 294,376.

This invention relates to a resilient mounting and more particularly to a resilient mounting for an internal combustion engine to be supported in an automobile frame.

An important object of the invention is to provide an inexpensive mounting of elastic material which is subjected to a tension. In the particular application of the invention illustrated a pair of metallic members are secured together by rubber vulcanized to each member. The engine is secured to one of the members and the other member is secured to the support thus suspending the engine entirely by the rubber tension.

Another object of the invention is to increase the vulcanizing area of the two members without increasing the size of the members themselves so that the size of the two members when vulcanized together is comparatively small as compared with the bonded or vulcanized area.

Other objects and advantages of the invention will be more fully described in the following description taken in connection with the accompanying drawings, in which.

Figure 1:
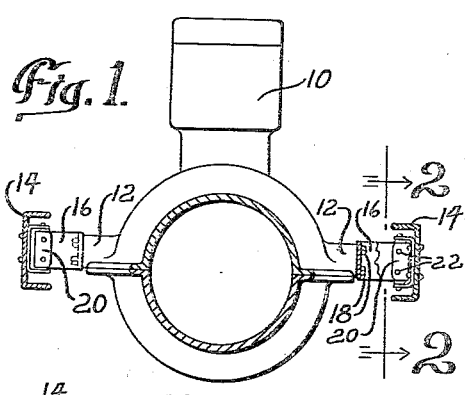
Fig. 1 is an end view of an internal combustion engine showing the side frame members of an automobile chassis in section.
Figure 2:
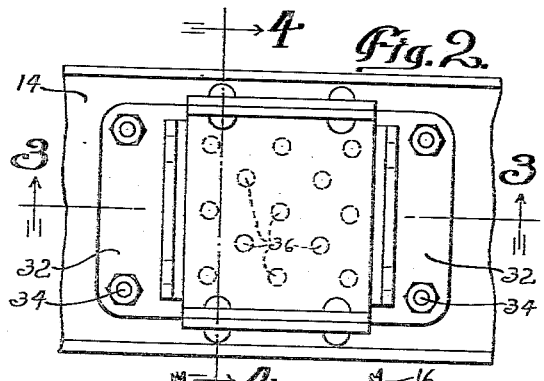
Fig. 2 is a view of the mounting secured to a side frame member, taken on line 2—2 of Fig. 1 with the motor arm removed.
Figure 4:
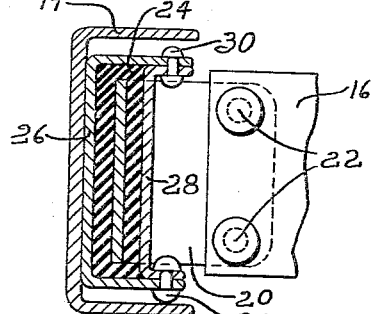
Fig. 4 is a sectional view on line 4—4 of Fig. 2.
Figure 3:
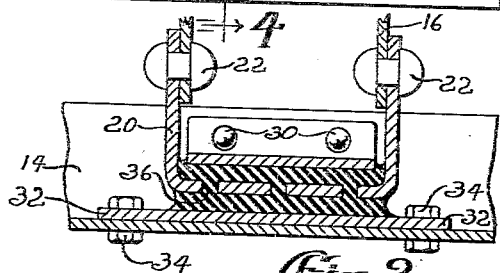
Fig. 3 is a sectional view on line 3—3 of Fig. 2.
Figure 5:
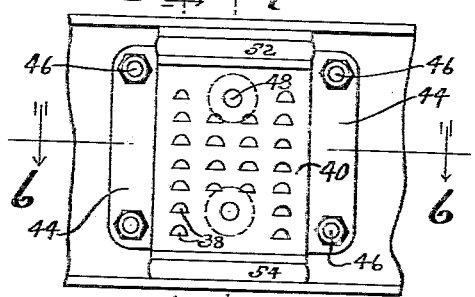
Fig. 5 is a view corresponding to Fig. 2 showing a modified form of the mounting.

Referring to the drawings, I have shown an internal combustion engine 10 provided with lateral arms 12 adapted to be supported between side frame members 14 of an automobile chassis. A U shaped stamping 16 is detachably secured to the outer ends of the arms 12 by bolts 18. The outer ends of the stampings are secured to another U shaped stamping 20 as by rivets 22 forming a portion of the resilient mounting. The stamping 16 is a part of the resilient mounting and forms a means on the mounting for detachably securing it to the motor arms. For purposes of manufacture it is desirable to make the two stampings separate and rivet them together but under certain conditions the two may be made as a single member.

In the form of the invention illustrated in Figs. 1 to 4 inclusive, a portion of the stamping 20 is embedded in rubber as at 24 held between an outer stamped member 26 and an inner member 28. The members are riveted together as at 30 forming a space therebetween for the rubber on the opposite sides and edges of a portion of the member 20. The members 20, 26 and 28 are held in their respective positions in a suitable mould while the rubber is poured into the space around that portion of the member 20 between the members 26 and 28. The rubber is vulcanized to the inner surfaces of the members 26 and 20 and to all outer surfaces of that portion of the member within the area of the members 26 and 28.

The member 26 is provided with lateral flanges 32 adapted to receive bolts 34 or other suitable fastening means which secure the mounting to the frame members. Openings 36 have been found in the member 20 to form a bond between the rubber on one side of the member 20 and the rubber on the other side of the member 20. The openings also increase the bonding area of the rubber on the member 20.

In a modified form of my device, shown in Figs. 5 to 8 inclusive, the contacting area of the metallic surfaces with the rubber has been increased by forming struck in lips 38 on a member 40 which the motor arm is secured to and a member 42 which is secured to the side frame member.

The member 42 is provided with lateral flanges 44 adapted to receive bolts 46 which secure the mounting to the frame. Openings 48 are formed in the member 40 to receive bolts which secure the mounting to the motor arm and openings 50 in the member 42 and rubber receive the heads of the bolts. It is desirable to have the lips 38 struck in a direction toward each other so that when the mounting is under tension the free edges of the lips are directed toward each other.

Figures 7, 8:
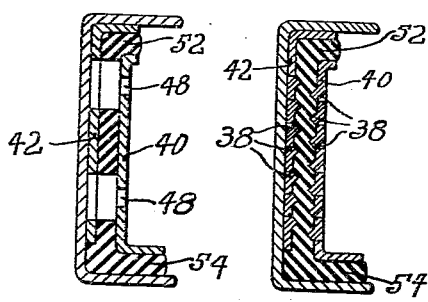
Fig. 7 is a sectional view on line 7—7 of Fig. 5.
Fig. 8 is a sectional view on line 8—8 of Fig. 5.
Figure 6:
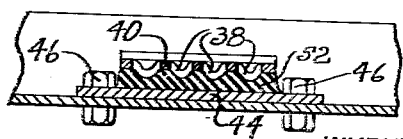
Fig. 6 is a sectional view on line 6—6 of Fig. 5.

As shown in Figs. 7 and 8 the upper and lower spaces 52 and 54 between the members 40 and 42 are filled with rubber to provide a cushioning means for the support.

It will be understood that various changes including the size and arrangement of parts may be made without departing from the spirit of my invention and it is not my intention to limit its scope other than by the terms of the appended claims.

What I claim is:

1. A mounting of the class described comprising a U shaped stamping adapted for securing its lateral flanges to an engine, a rectangular member embracing the central portion of said U shaped stamping, rubber between and vulcanized to the adjacent faces of said members, and means for securing said rectangular member to a support.

2. An article of manufacture comprising a rectangular member formed from stampings, a member having a portion embraced by said rectangular member, attaching means on each of said members extending beyond said rectangular member, and rubber between the adjacent faces of said members and forming the sole connection therebetween.

3. An article of manufacture comprising outer U shaped members secured together with their central portions forming a rectangular member, another U shaped member having its central portion in the rectangular member and provided with openings, and rubber around all the edges of the central portion of said last named U shaped member.

4. A mounting of the class described comprising a metallic member provided with struck in tongues and adapted to be secured to a support, another metallic member provided with struck in tongues and adapted to be secured to a member to be supported, the tongues of one member extending toward and on a line with the tongues of the other member, and rubber between said members.

ROGER K. LEE.